United States Patent [19]

Shariff et al.

[11] 4,242,718

[45] Dec. 30, 1980

[54] CONTROL CENTER WITH INTERFITTING DIELECTRIC BARRIERS FOR BUS BARS

[75] Inventors: Sadiq A. Shariff, Palos Park; John R. Wilson, Darien; Brij M. Bharteey, Bolingbrook; Neal E. Rowe, Oak Forest, al of Ill.

[73] Assignee: Westinghouse Electric Corp., Pittsburgh, Pa.

[21] Appl. No.: 11,985

[22] Filed: Feb. 14, 1979

[51] Int. Cl.³ .............................................. H02B 1/04
[52] U.S. Cl. .................................. 361/341; 361/342; 361/361; 174/70 B
[58] Field of Search ................. 174/68 B, 70 B, 71 B, 174/72 B; 361/334, 335, 341, 342, 355, 356, 361, 378

[56] References Cited

U.S. PATENT DOCUMENTS

| 4,024,441 | 5/1977 | Coyle | 361/334 |
| 4,025,826 | 5/1977 | Wilson | 361/334 |

Primary Examiner—Gerald P. Tolin
Attorney, Agent, or Firm—L. P. Johns

[57] ABSTRACT

A control center for distributing electric power from a power supply source to power consuming devices characterized by a plurality of parallel bus bars covered on each side with dielectric barriers in surface-to-surface contact with the bus bars, the barriers comprising a plurality of sheet-like barrier members in end-to-end abutment which members include cooperating first interfitting portion and extending between each pair of adjacent bus bars, the abutting ends of the barriers having cooperating second interfitting end portions to provide a labyrinth-like structure between adjacent bus bars to maintain insulating and isolating properties between adjacent bus bars.

6 Claims, 8 Drawing Figures

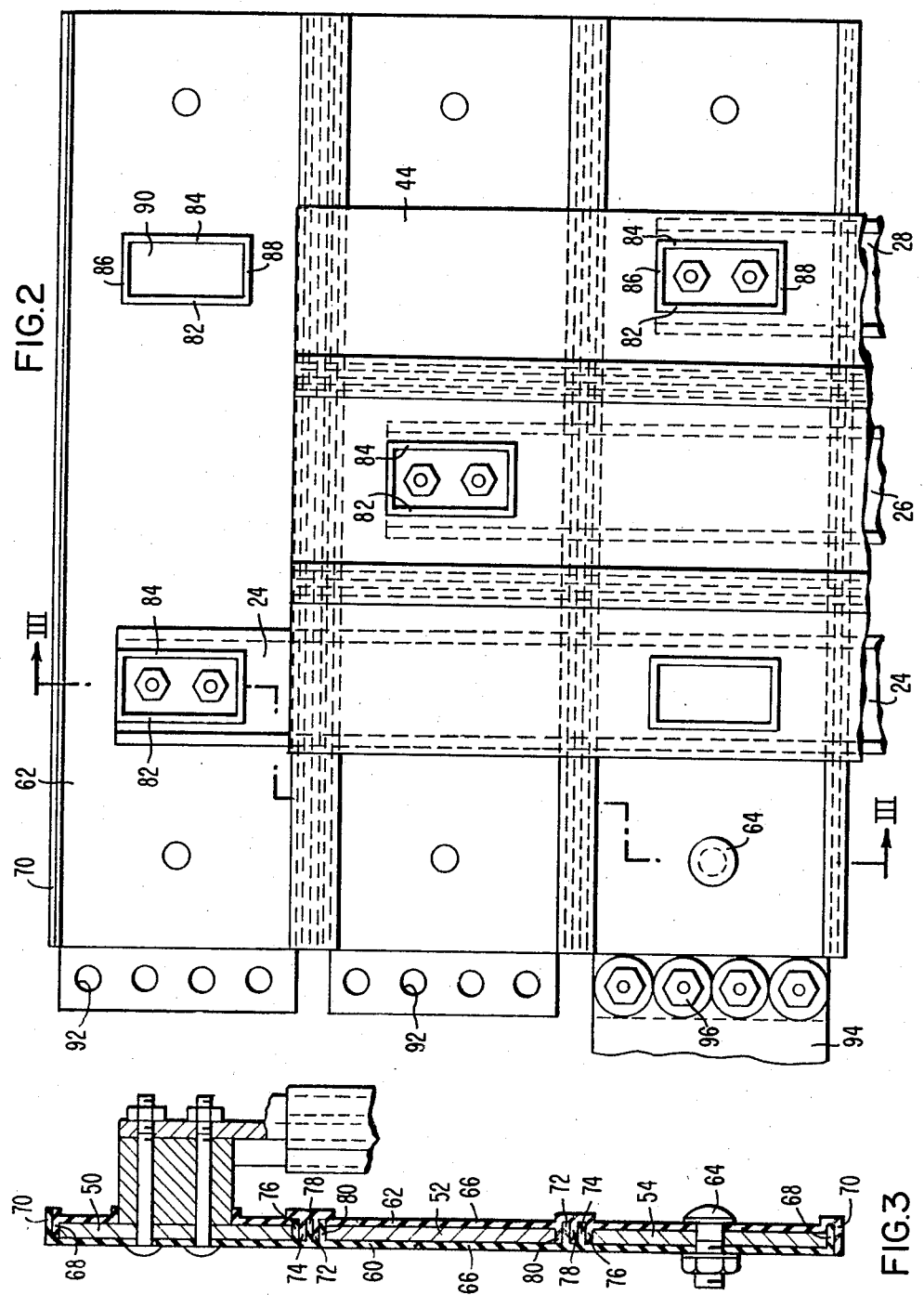

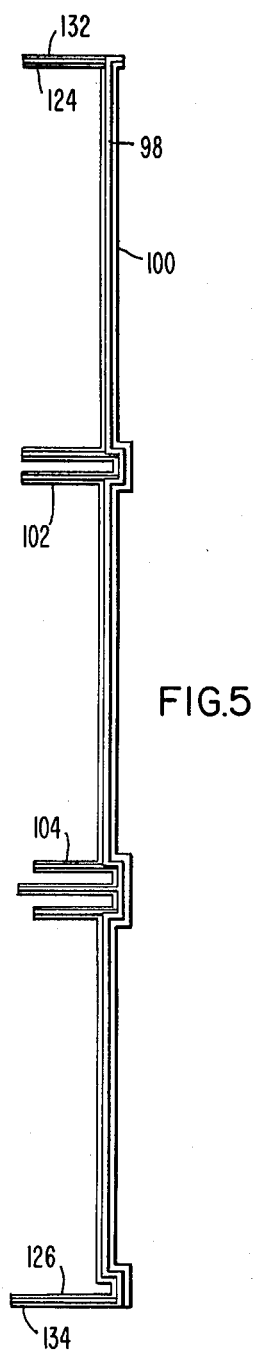
FIG.5
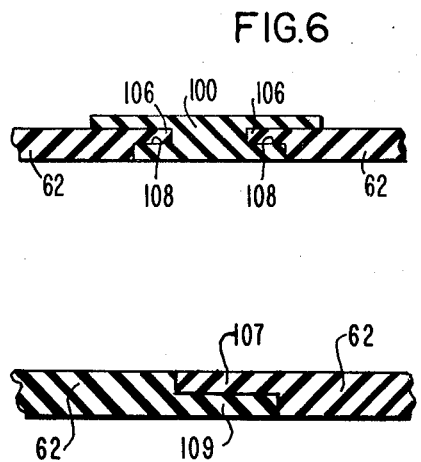
FIG.6
FIG.6A
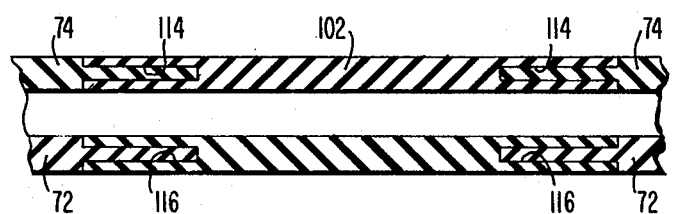
FIG.7

CONTROL CENTER WITH INTERFITTING DIELECTRIC BARRIERS FOR BUS BARS

CROSS REFERENCE TO RELATED APPLICATIONS

This invention relates to the copending application of S. A. Shariff, B. M. Bharteey, J. R. Wilson, and Neal E. Rowe, Ser. No. 946,702, filed Sept. 28, 1978.

BACKGROUND OF THE INVENTION

1. Field of the Invention

This invention relates to a control center and, more particularly, to isolated and insulated bus bars therein.

2. Description of the Prior Art

In a motor control center, the distribution of power by the bus bar system is a vital factor that influences the design concept. This is particularly true with regard to operator safety and damage to equipment due to short circuits. The horizontal bus bars distribute power from a power supply source to power consuming devices through a number of vertical bus bars.

With the development of dielectric barriers which are provided in duplicate for end-to-end placement over the entire length of the vertical bus bars as well as the horizontal bus bars, there has been a problem of creepage distance between two adjacent bus bars at the abutting ends of the barrier sections. During a fault it has been possible for ionized gases to travel laterally through the space between the abutting barrier sections, thus aiding in the propagation of an electric arc.

Patent disclosing insulated bus bars in various aspects are U.S. Pat. Nos. 3,096,131; 3,113,820; 3,170,092; 3,840,785; 4,024,441; 4,025,747; 4,025,826; and 4,038,585.

SUMMARY OF THE INVENTION

In accordance with this invention, it has been found that the foregoing considerations are satisfied by providing a plurality of cabinets having a plurality of vertical compartments on the front side of each cabinet, a set of a plurality of vertical, horizontally spaced bus bars in each cabinet, a set of a plurality of horizontal, vertically spaced bus bars in each cabinet and electrically connected to corresponding vertical bus bars, at least one of the sets of vertical and horizontal bus bars being covered on each side with dielectric barriers in surface-to-surface contact with the bus bars, the barriers comprising a plurality of sheet-like barrier members in end-to-end abutment, the barrier members including cooperating first interfitting portions including a tongue-receiving groove in one member and a tongue in the other member and extending between each pair of adjacent bus bars, the abutting ends of the barrier members having cooperating second interfitting portions to provide a labyrinth-like structure between adjacent bus bars and between abutting ends of the tongue-receiving groove and the tongue so as to maintain isolating and insulating properties between adjacent bus bars, the abutting ends of the first interfitting portions comprising third interfitting portions, the abutting ends of the first interfitting portions being unaligned with the second interfitting portions, the third interfitting portions comprising tongue and groove joints, the opposite ends of each barrier member comprising complementary interfitting portions and the complementary interfitting portions comprising tongue-in-groove joint members.

The advantage of the device of this invention is that a labyrinth joint is provided between adjacent dielectric barriers in such a manner as to maintain insulation and isolation properties of the adjacent bus bars.

BRIEF DESCRIPTION OF THE DRAWINGS

FIG. 2 is a vertical plan view taken on the line II—II of FIG. 1;

FIG. 3 is a vertical sectional view, taken on the line III—III of FIG. 2;

FIG. 5 is a vertical plan view of the connected link between the adjacent panels taken on the line V—V of FIG. 4;

FIG. 6 is a fragmentary sectional view showing the manner in which a connecting link is interconnected between adjoining barrier sections; and FIG. 6A is a fragmentary sectional view showing the manner in which adjacent edges of the adjacent barrier sections may be joined without a connecting link; and FIG. 7 is a fragmentary sectional view showing the manner in which other portions of the connecting link are interconnected to the interfitting ribs of the barrier sections.

DESCRIPTION OF THE PREFERRED EMBODIMENTS

Figure 1:
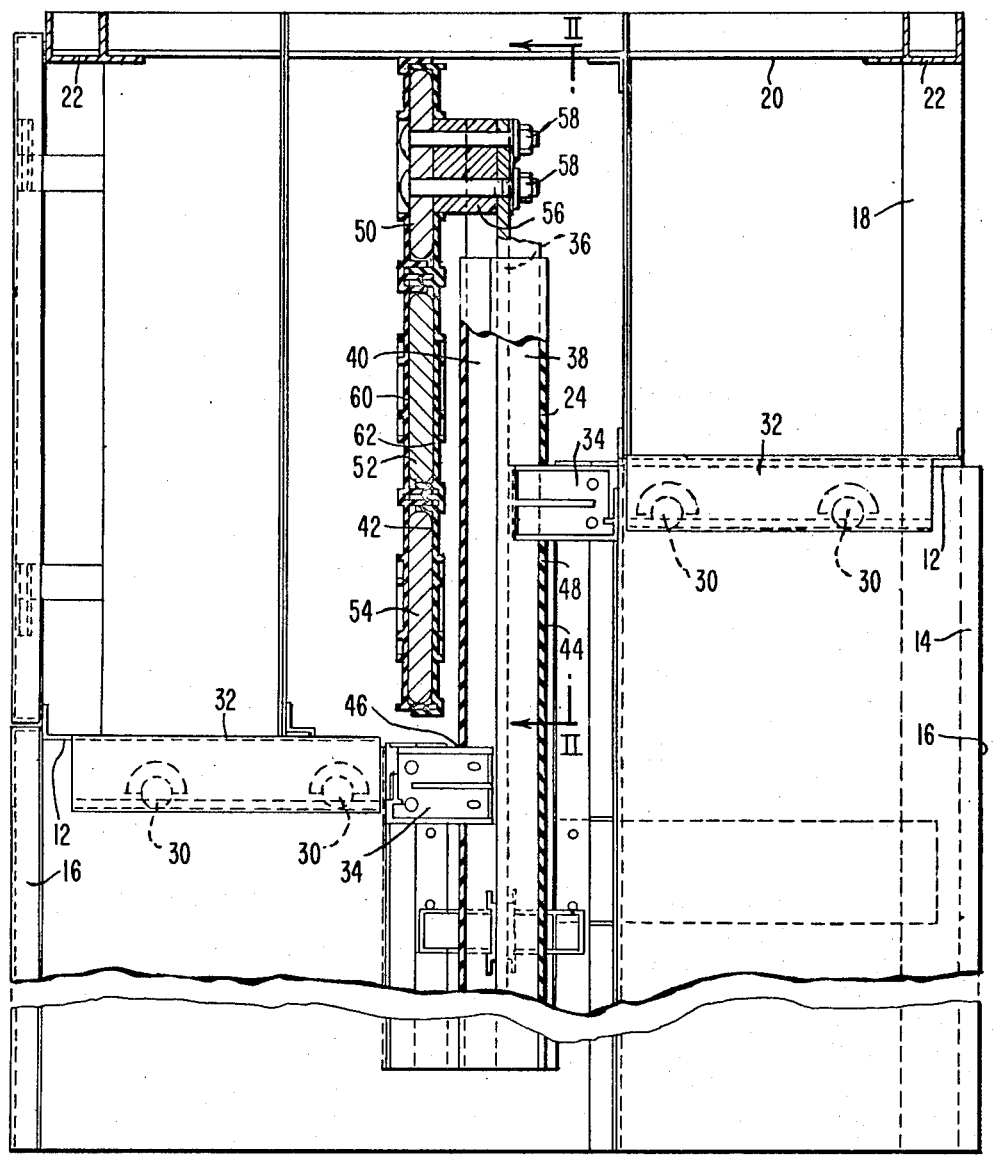
FIG. 1 is a vertical sectional view through an electrical control center.

The control center of this invention is similar to that shown in U.S. Pat. Nos. 4,024,441 and 4,025,826, and is generally indicated at 10 in FIG. 1. The control center 10 comprises a metal cabinet having a plurality of vertically disclosed compartments, such as a compartment 12, to accommodate circuit breakers, such as a circuit breaker 14, in the compartment 12. Each compartment includes an access door, such as a door 16, to enable admittance to the compartment. The control center 10 comprises a rectangular steel framework consisting of U-shaped corner posts 18 and horizontal interconnectors 20, 22 at upper and lower ends in a conventional manner. The front and rear sides of the control center 10 likewise include compartments 12 into which circuit breakers 14 are inserted from opposite sides of the vertical bus bars 24, 26, 28 (FIG. 2) which are centrally disposed front and rear sides of the control center. The device of this invention, however, is operative similarly where the rear side of the control center is not adapted for the mounting of circuit breakers 14.

As shown in FIG. 1, the circuit breakers 14 comprise a pair of mounting members, such as rollers 30, which extend from each opposite side wall and engage similar mounting tracks or guides 32 which depend from adjacent frame members, such as the corner posts 18. Each circuit breaker 14 is provided with plug stabs 34 that engage the vertical bus bars 32, 34, 36 which are Z-shaped members comprising intermediate portions 36 and legs 38, 40 extending in opposite directions and from opposite edges of the intermediate portions. Thus, the leg 38 is engaged by the plug in stab 34 on the right, as viewed in FIG. 1, and the leg 40 is engaged by the plug in stab 34 on the left.

The vertical bus bars 24, 26, 28 (FIGS. 1 and 2) are contained within a pair of insulating and isolating barriers 42, 44 in a manner similar to that shown in U.S. Pat. No. 4,038,585, which barriers include spaced openings 46, 48, respectively, through which the stabs 34 extend to enable electrical connection with the corresponding legs 38, 40 of the vertical bus bars. The insulating barriers 42, 44 are substantially coextensive with the vertical bus bars and may be provided either as one elongated section covering the substantially entire length of the bus bars, or in shorter sections disposed in end-to-end abutment.

A plurality, preferably three, horizontal bus bars 50, 52, 54 are disposed (FIGS. 1 and 2) at the upper end of the control center 10 where they are mounted in vertically spaced positions for connection with the upper ends of the corresponding vertical bus bars 24, 26, 28, respectively. Good electrical connections between the vertical and horizontal bus bars are provided by suitable means, such as a conductor spacer 56, which is disposed between each pair of corresponding vertical and horizontal bus bars by nut and bolt assemblies 58.

The horizontal bus bars 50, 52, 54 are encased within covers for barriers 60, 62 which are sheet-like members and consist of electrically insulating material having good heat-transfer properties. The barriers 60, 62 in surface-to-surface contact with the bus bars, are identical in configuration and are retained together by suitable means, such as nut and bolt assemblies 64, in aligned holes in the barriers 60, 62 and the corresponding bus bars (FIG. 2).

The separable barriers 60, 62 (FIG. 3) are of similar construction and produced in similar molds. Thus, each barrier 60, 62 comprises a substantially planar body portion 66 with similar upper and lower interfitting means or flanges 68, 70. The flanges 68 are shorter than the flanges 70 and are in tight fitting surface-to-surface contact with each other at upper and lower edges of the barriers.

Each barrier also comprises first interfitting or labyrinth means including a pair of spaced flanges 72, 74 which interfit with spaced flanges 76, 78, 80 on the opposite member. Thus, the first interfitting flanges 72-80 provide tongue and groove interfitting means to make required electrical creepage distance between the phases of the spaced bus bars 50, 52, 54. In that manner, the assembled barriers including the several flanges 68-80 provide insulated and isolated compartments in which the horizontal bus bars 50, 52, 54 are mounted. Each barrier 60, 62 (FIG. 2) comprises spaced vertical ribs 82, 84 as well as spaced horizontal ribs 86, 88 which surround similar portions for knockouts 90 which are removable to expose the underlying surfaces of the horizontal bus bars 50-54 when necessary for connection of corresponding vertical bus bars 24-28. The locations of knockout portions 90 provide a pattern to facilitate the alternate connections between horizontal and vertical bus bars. Moreover, the horizontal bus bars 50-54 have holes 92 for connection of each bus bar to a supply conductor 94 by suitable means such as nut and bolt assembly 96.

Usually horizontal bus bars supply current to more than one control center 10 which as shown in related patents, such as U.S. Pat. No. 4,025,826, are disposed in adjacent vertical cabinets with the horizontal bus bars extending to the upper portions thereof and thereby being connected to corresponding vertical bus bars in each cabinet. In that event, the dielectric barriers 60, 62 are disposed in barrier sections in end-to-end abutment along the entire length of the bus bars.

Figure 4:
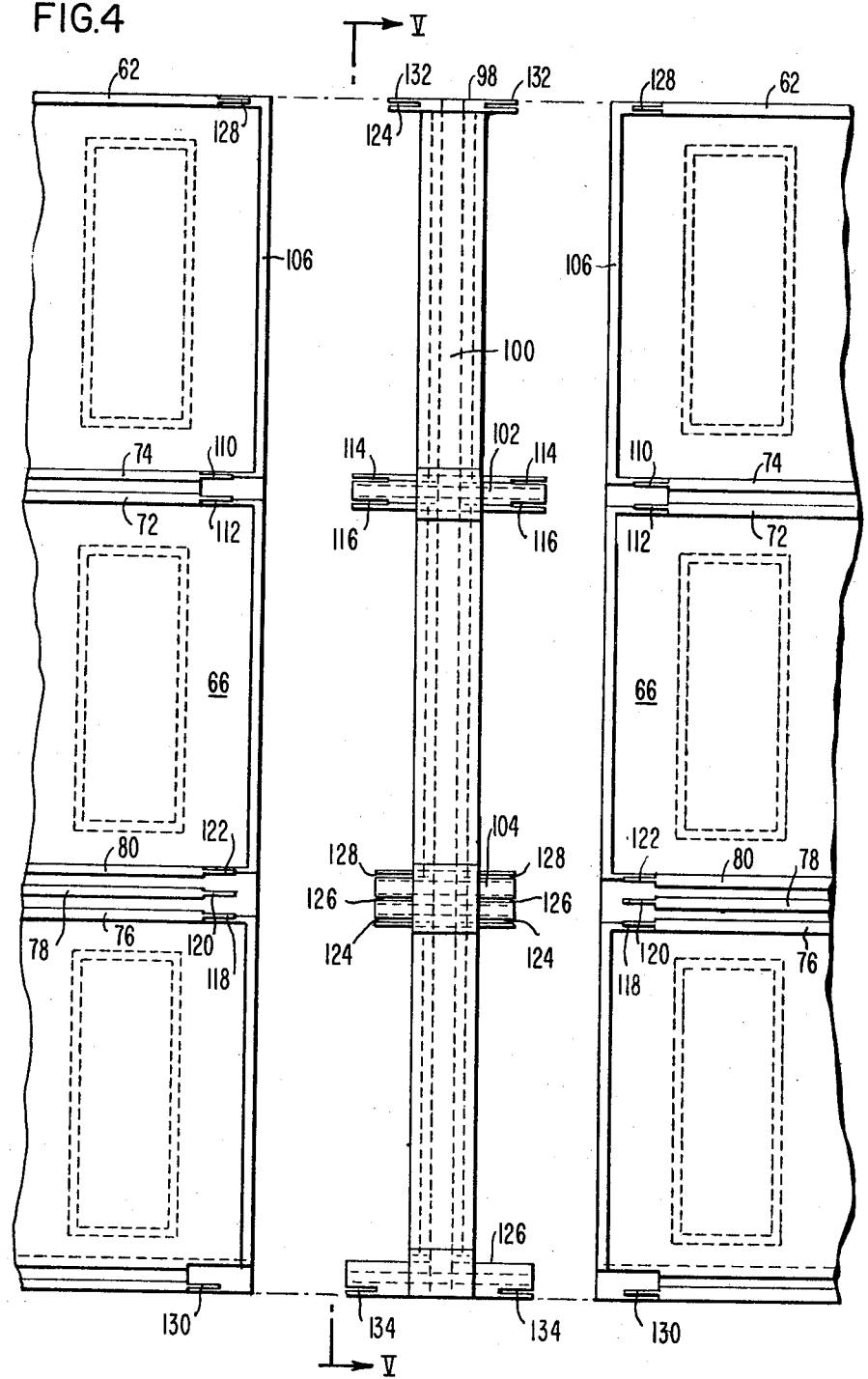
FIG. 4 is an exploded view showing the manner in which adjacent dielectric barrier sections are interconnected.

In accordance with this invention the abutting barrier sections are provided with cooperable second interfitting means for preventing ionized gases from escaping through the seam of the assembled barriers and thereby causing possible arcing between the spaced bus bars. More particularly, electrical creepage results from ionized gas or dirt or dust and disposed in the seam where the arcing may occur because of an inadequate length of surface between the bus bars. The cooperating interfitting means provides the length of surface necessary to avoid electrical creepage. The second interfitting means may comprise an interconnecting or adaptor link 98 (FIGS. 4 and 5), or the adjacent barrier sections may be provided with cooperating interfitting joint members 107 and 107 (FIG. 6A) for which the link 98 is not required. Suffice it to say, the link 98 (FIG. 4) comprises cooperating interfitting means including tongue and groove members for providing a labyrinth barrier between flanges 68, 70 as well as flanges 72–80. In addition, interfitting means are provided by the link 98 between the abutting edges of the planar body portions 66 of adjacent barrier sections 60 and between sections 62.

The link 98 (FIGS. 4 and 5) comprises an elongated body 100 having spaced third interfitting means 102, 104 disposed at intervals therealong equal to the spacing between the groups of flanges 72, 74 and flanges 76, 78, 80. In addition, the elongated body 10 having opposite edges abuttable with corresponding edges of the adjacent barriers 62 includes other interfitting means along each edge engageable with cooperating interfitting means along the edges of the barriers. These interfitting means include tongue and groove members (FIG. 6) comprising a tongue 106 along the edge of each barrier 62 and a groove 108 along each opposite edge of the elongated body 100, so that when fitted together the barriers 62 and the link 98 form a devious or labyrinth path which defeats electrical creepage resulting from ionized gas and/or accumulated dirt.

The interfitting means 102 functions with the flanges 72, 74 which comprise tongues 110 and 112 which engage similar grooves 114, 116 in the interfitting means 102. Thus, when the members 62 and 98 are assembled (FIG. 7), the interfitting parts 110–116 provide another devious or labyrinth joint between the interconnected flanges 72, 74 also comprising the third interfitting means. In a similar manner, the flanges 76, 78, 80 comprise tongues 118, 120, 122 which in turn engage grooves 124, 126, 128 in the interfitting means 104. Accordingly, the parts 118–128 provide a devious or labyrinth path between the flanges 76, 78, 80 at the joint between the adjacent barrier 62.

Finally, fourth interfitting is provided at opposite ends of the link 98 which means interengage the flanges 68, 70 along the opposite edges of the barriers 60, 62. The fourth interfitting means 124, 126 comprise similar tongues 128, 130 and grooves 132, 134 between the flanges 68, 70 to provide a devious or labyrinth path between the outer bus bars 50, 54 and the exterior of the assembly of the horizontal bus bars and enclosing barriers.

Accordingly, the device of this invention provides horizontal and vertical labyrinth type joints between spaced bus bars, the interior and exterior of the assembled bus bars and barriers, as well as between adjacent barriers, and between corresponding flanges extending between the spaced bus bars. As a result, a prior existing problem of electrical creepage between abutting ends of dielectric barriers is solved.

What is claimed is:

1. A control center for distributing electric power from a power supply source to power consuming devices, comprising:
   a plurality of cabinets having a plurality of vertically spaced compartments in each cabinet;
   a set of a plurality of vertical, horizontally spaced, bus bars in each cabinet;
   a set of a plurality of horizontal, vertically-spaced, bus bars in each cabinet and electrically connected to corresponding vertical bus bars;
   a dielectric barrier on each side of at least one of the sets of horizontal and vertical bus bars and the barrier on each side comprising a number of barrier sections disposed along the length of the bus bars and in surface-to-surface contact therewith;
   the barrier sections being sheet-like members having opposite side, edge, and end surfaces;
   first cooperating interfitting means including first tonque and groove members extending from facing side surfaces of each barrier and between the bus bars of each set of bus bars; and
   second cooperating interfitting means including second tongue and groove members along the abutting end portions of the adjacent barrier sections.

2. The control center of claim 1 in which the first tongue and groove members are substantially perpendicular to the second tongue and groove members.

3. The control center of claim 2 in which an adaptor link is disposed between and attached to the end surfaces of adjacent barrier sections and extends transversely to the bus bars on which the barriers are mounted and in which the adaptor link comprises third tongue and groove members fitting the second tongue and groove members on one of the barrier sections, and fourth tongue and groove members facing a direction opposite that of the third tongue and groove members and fitting second tongue and groove members on the adjacent barrier section.

4. The control center of claim 3 in which the adaptor link comprises an elongated member extending between the end surfaces of adjacent barrier sections and having third cooperating interfitting means including corresponding tongue and groove members engaging with the first tongue and groove members on each of the barrier sections.

5. A control center for distributing electric power from a power supply source to power consuming devices, comprising:
   a plurality of cabinets having a plurality of vertically spaced compartments in each cabinet;
   a set of a plurality of vertical, horizontally spaced, bus bars in each cabinet;
   a set of a plurality of horizontal, vertically-spaced, bus bars in each cabinet and electrically connected to corresponding vertical bus bars;
   a dielectric barrier on each side of at least one of the sets of horizontal and vertical bus bars and the barrier on each side comprising a number of barrier sections disposed along the length of the bus bars and in surface-to-surface contact therewith;
   the barrier sections being planar members having opposite side, edge, and end surfaces;
   first cooperating interfitting means including first tongue and groove members extending from opposite side surfaces of each of the sections and between the bus bars of each set of bus bars;
   an adaptor link between and attached to the end surfaces of adjacent barrier sections and comprising second cooperating interfitting means including corresponding tongue and groove members engaging the second tongue and groove members on the barrier sections; and
   the adaptor link also comprising an elongated member extending between the end surfaces of the adjacent barrier sections and including third cooperating interfitting means having corresponding tongue and groove members engaging with the third tongue and groove members on each of the barrier sections.

6. The control center of claim 8 comprising fourth cooperating interfitting means including overlapping flanges along the facing edges of the barrier sections.

* * * * *